United States Patent [19]
Barr et al.

[11] Patent Number: 6,161,076
[45] Date of Patent: Dec. 12, 2000

[54] SEISMIC DATA ACQUISITION AND PROCESSING USING NON-LINEAR DISTORTION IN A VIBRATORY OUTPUT SIGNAL

[75] Inventors: Frederick J. Barr, Pearland; William H. Dragoset, Jr., Houston, both of Tex.

[73] Assignee: Baker Hughes Incorporated, Houston, Tex.

[21] Appl. No.: 09/318,282

[22] Filed: May 25, 1999

Related U.S. Application Data

[63] Continuation-in-part of application No. 08/970,631, Nov. 14, 1997, abandoned.

[51] Int. Cl.$^7$ ........................................... G01V 1/28
[52] U.S. Cl. ........................ 702/17; 367/43; 367/117
[58] Field of Search ................ 702/17, 14; 367/23, 367/21, 22, 43, 45, 117

[56] References Cited

U.S. PATENT DOCUMENTS

| | | | |
|---|---|---|---|
| 4,809,235 | 2/1989 | Dragoset, Jr. | 367/21 |
| 5,703,833 | 12/1997 | Allen | 367/46 |
| 5,721,710 | 2/1998 | Sallas et al. | 367/41 |

Primary Examiner—Donald E. McElheny, Jr.
Attorney, Agent, or Firm—Madan, Mossman & Sriram, P.C.

[57] ABSTRACT

A method for improving vibratory source seismic data uses a filter which converts a recorded seismic groundforce signal (including harmonic distortion therein) into a desired short-duration wavelet. A plurality of surveys may be carried out using a plurality of sweeps from plurality of vibrators that have their relative phases encoded, the groundforce signal of each vibrator being measured. The recorded seismic reflection signals are then processed to separate out the signals from each vibrator. In another aspect, harmonics of upto any desired order may be canceled while carrying out multiple surveys with a plurality of vibrators. In a marine environment, the recorded signal from a vibrator towed by a moving vessel is used to derive a Doppler shift correction filter that is applied to reflection seismic data.

44 Claims, 7 Drawing Sheets

SEISMIC DATA ACQUISITION AND PROCESSING USING NON-LINEAR DISTORTION IN A VIBRATORY OUTPUT SIGNAL

REFERENCES TO RELATED APPLICATIONS

This application is a Continuation-in-Part of U.S. patent application Ser. No. 08/970,631, filed on Nov. 14, 1997, abandoned.

FIELD OF THE INVENTION

The present invention is directed to seismic data processing, to pre-processing seismic data in which data generated by a vibrating source is received and prepared for data processing, and to methods for refining seismic field data.

DESCRIPTION OF RELATED ART

Certain prior art seismic data acquisition and processing systems use a vibratory source to apply a force to the ground and measure subsequent motion caused by the application of this force at various receiver locations. By controlling the duration and frequency of the force a broad band signal with sufficient energy is achieved. By using the receiver motions and assumed force application a seismogram is constructed (typically by correlation with an estimate of the applied force) from which properties of the impedance function of the earth can be calculated. In certain systems data that is generated by a vibratory source is correlated with a reference sweep. A reference sweep signal is an ideal signal which the vibrator is told to put into the ground, which is often quite different from the actual signal which is generated. The typical estimate for the applied force is the mass weighted sum of the acceleration of the baseplate used in the vibrating source and the acceleration of the reaction mass used in the vibrator structure, called the groundforce.

One prior art method commonly used in the seismic industry for compressing seismic field data is that of cross-correlating each seismic trace with a pilot sweep used to drive vibrators. The pilot sweep is typically a sinusoidal signal whose instantaneous frequency increases or decreases with time in a preprogrammed manner. Electronic systems are built into field recording systems to perform this mathematical computation prior to writing the resulting, compressed traces to magnetic tape. A shortcoming of this method is that it ignores distortions in the actual output of a vibrator unit caused by non-linearities in both the electro-hydraulic system and the elastic properties of the topsoil against which the vibrator's baseplate applies its force signal. This soil non-linearity can be expected to be different for each location where the vibrator inputs its force signal. These system non-linearities cause the actual force output signal from the vibrators to contain the fundamental pilot sweep signal as well as harmonics and sub-harmonics of that sweep signal. Hence, each subsurface reflection is represented in the uncompressed data by this distorted sweep signal. When the uncompressed data are crosscorrelated with the pilot sweep, the fundamental pilot sweep portion is compressed into the desired zero-phase Klauder wavelet. However the harmonics and sub-harmonics manifest themselves as coherent noise.

U.S. Pat. No. 5,550,786 discloses a method for processing data from a system using an accelerometer on a vibrator's baseplate and an accelerometer on a reaction mass used with the vibrator structure. A signal which is minimum phase related to the actual force generated into the surface of the earth is measured and taken from a vibrator source directly, i.e., an actual signal [not a measured groundforce signal, but an accelerometer (baseplate or reaction mass) signal] is used in the process instead of a theoretical signal. A method is provided for recording and pre-processing high resolution vibratory source data for both land and marine environments which includes measuring the motion or motions of the vibrator which are related to the actual vibrator applied force by a transfer function of a minimum phase, causal, linear system. This system relates the actual vibrator output with the measured vibrator motion or motions. A ratio is determined by dividing the vibratory seismic data by the measured motion or motions of the vibrator to remove the unknown applied force leaving the earth reflectivity times a time derivative divided by a minimum phase function. Minimum phase deconvolution is performed to remove the time derivative divided by the transfer function of minimum phase. The method may also include the steps of receiver ensemble deconvolution, statics correction, F–K (frequency-wave number domain) filtering for linear noise, zero phase spiking deconvolution and model dephasing. In this method, a signal directly related to the actual signal that the vibrator is sending into the ground is used in pre-processing. The vibrator motion or motions are measured to provide a signal that is used to process the data. Thus, the data is not correlated with a theoretical sweep signal, but is divided by a minimum phase relative of the actual transmitted signal in the frequency domain, which removes the actual transmitted signal from the determination. When solving for the earth reflectivity, data is basically divided by the vibrator groundforce multiplied by a transfer function of minimum phase, removing the vibrator force from the data. This leaves the earth reflectivity multiplied by a time derivative divided by a minimum phase transfer function, which ratio is then removed by minimum phase deconvolution.

Each recorded trace is inverted as follows:

$$C(\omega)=T(\omega)/A(\omega)$$

where:

$C(\omega)$=Fourier transform of the inverted trace $T(\omega)$=Fourier transform of the recorded seismic trace $A(\omega)$=Fourier transform of the baseplate or reaction mass accelerometer signal The method applies a minimum phase bandpass filter and then relies upon statistical, spiking deconvolution of the resulting trace to obtain a minimum phase wavelet that represents each subsurface reflector in the trace. This method requires the application and proper function of spiking deconvolution to achieve correct results. The presence of random noise in the inverted traces can compromise the effectiveness of the derived spiking deconvolution operator.

In another prior art method Li has attempted to eliminate ghost noise (non-linear noise related to electrohydraulic system and/or baseplate coupling) in uncorrelated seismic (e.g. vibroseis) data using an inversion approach similar to that of U.S. Pat. No. 5,550,786, except that computed groundforce is used. In this system a recorded groundforce signal, known to be a better correlator for a seismogram than a pilot sweep itself, is used to deconvolve the vibrogram. In such a way a ghost sweep, produced by severe harmonic distortions in the groundforce signal both at negative and positive correlation times (if such a signal is used as the correlator), is eliminated automatically. This method eliminates the correlation noise caused by both the upsweep or by the downsweep pilot signal. Synthetic and real data are used to demonstrate the application of the inversion procedure and the results differ from those achieved with the correlation procedure. After a first inversion, a second filter (e.g. an inverse Q-filter) may be applied to eliminate stratigraphic effects.

Li noted that harmonic distortion occurs in most vibrator operations on land because nonlinear effects cause an actual baseplate signal to differ from the signal of the pilot sweep of the encoder. In choosing which signal to use to correlate a vibroseis trace, Li refers to the work of Seriff and Kim (1970) which provided a fundamental study according to which the harmonic distortion creates either a correlation-ghost forerunner or a tail at both positive and negative correlation times if the harmonically distorted sweep is used as the correlation operator. Seriff and Kim conclude that the correlation of the seismic trace with the harmonically distorted sweep is not desirable if the aim is the elimination of the correlation-ghost (sweeps) in the correlated trace. Li also noted that the baseplate signal, which is part of the groundforce, may in fact be a better correlator than the pilot sweep. The reason is that it represents the actual signal propagating into the earth.

Another prior art method known as the pure phase shift filter (PPSF) method exploits the definition of a linear sweep and is implemented as a modification of known correlation processes. It is applied to synthetic and real data for practical results, and due to its mathematical background, is restricted to seismic data generated by upsweeps. Another common method, the variphase sweep method, attempts to eliminate the harmonic distortion of downsweeps. However, it is used to reduce harmonic distortion only with limited success, largely because it is difficult to implement and control with respect to quality (Martin, 1993).

In certain prior art systems, the correlation of a recorded seismogram with a groundforce signal (which includes harmonic distortions and inaccuracies in the feedback system of the vibrator), is based on a conventional convolution model. After the correlation, the seismogram resembles a shot seismogram, but with correlation-ghost noise (non-linear). The PPSF method eliminates the harmonic distortions in the groundforce signal before such a signal is used as the correlator. Provided that the convolution model is true and the groundforce signal is the signal which is propagating from the vibrator into the earth, correlation-ghost noise is eliminated by using deterministic deconvolution instead of carrying out a conventional correlation. The seismogram is deconvolved with the groundforce signal in the given sweep frequency range to give a reflection seismogram.

In the acquisition of seismic data, a plurality (three or more) of vibrators is commonly used for acquiring seismic data. The vibrators are positioned at substantially the same location and are controlled to emit simultaneously the same signal. Although three vibrators may be used, only one survey is conducted. In many instances, it would be economical to conduct multiple surveys at the same time, at the same general location, especially when performing 3-D seismic surveys. However, in order to conduct multiple surveys at the same time, at the same general location, it is necessary to somehow be able to distinguish, in the recorded signal, signals being emitted by any particular vibratory source from the signals of any other vibratory source. The term "vibratory source" here is intended to mean either a single vibrator or a plurality of vibrators which are controlled to emit a common signal at substantially the same location.

U.S. Pat. No. 3,885,225 to Anstey et al proposes a method to distinguish between multiple sources. Anstey et al is directed to a method and apparatus for broad-line seismic profiling, using several vibrators simultaneously emitting signals. The normal emission frequency bandwidth is divided into several parts which are allocated to individual vibrators in a sequence of separate emissions, in such a way that mutually exclusive frequencies are radiated by the several vibrators at any one time. The detected signals are separated on the basis of frequency to represent the individual signals from each vibrator. However, the frequency limitation on each individual vibrator reduces the sensitivity of the survey. Further, the '225 patent admits that harmonic distortion in the vibrators or their coupling with the ground can impair the capacity of the correlation process to separate the signals from different generators, but makes no attempt to remove or reduce this distortion.

Another method of separating signals from multiple vibratory sources using phase shifting of the signals on different sweeps is disclosed in U.S. Pat. No. 4,715,020 to Landrum. A plurality of vibratory sources, equal in number to the number of seismic surveys being conducted, transmit signals into the earth. After the first transmission is completed, additional transmissions are performed in which the phases of the signals transmitted by the various vibratory sources are selectively shifted. The number of phase relationships is equal to the number of vibratory sources. The detected signal resulting from each simultaneous transmission is correlated separately with the signal transmitted by each vibratory source during the transmission. These correlated signals are then "stacked" to separate out the signals emanating from each vibratory source. However, the problem of harmonic distortion and crossfeed is not mentioned in this patent.

U.S. Pat. No. 4,982,374 issued to Edington et al. This invention provides a method whereby the distortion and crossfeed up to any harmonic order may be significantly reduced for any number of vibratory seismic sources operated concurrently, at the same time providing for signal separation and for signal-to-noise ratio improvement. The method comprises determining the highest order harmonic which has sufficient signal strength to cause significant harmonic distortion of the sweep signals. The number of sweeps to be used is then selected, based on the number of sources and the degree to which it is desired to cancel harmonics. Initial phase angles for each sweep of each source are then selected so that substantially all harmonics up to and including the highest order harmonic determined to cause significant distortion are suppressed. The method, as disclosed, is only able to remove harmonics of up to a prespecified number. The basic approach is to specify the number of sources and then determine the number of sweeps required to cancel the required number of harmonics. The method is based upon crosscorrelating the measured signals with a reference sweep signal.

U.S. Pat. No. 4,809,235 issued to Dragoset Jr. discusses the problems encountered in the use of vibrators towed by a moving ship for marine seismic data acquisition. In the normal mode of marine operations, the seismic ship, the source, and the receivers move continuously through the water as data are recorded. Because of that motion, the possibility exists of Doppler shifting of the vibratory signals emitted by the source and detected by the receivers. The invention of Dragoset is a method of reducing phase distortion in a detected seismic signal caused by Doppler shifting of the transmitted signal. An operator is convolved with the seismic data to correct the distortion. The operator is determined for the particular transmitted signal and boat speed. The operator is normally determined in the frequency-wave number domain. The seismic data may be transformed to the frequency-wave number domain for performing the convolution. The transformed data may then be transformed back to the time-space domain. Alternatively, the determined operator may be transformed to the time-space domain and the convolution performed in that domain.

There has long been a need for an effective and efficient seismic data pre-processing method for vibratory signals. Such a method should preferably not employ spiking deconvolution techniques and should be able to correct for harmonic distortion of outgoing signals. Additionally, such a method should be usable with multiple seismic surveys carried out simultaneously with a plurality of vibrators. Such a method should preferably also be usable in marine seismic acquisition where the vibratory sources are in motion. The present invention satisfies these needs.

SUMMARY OF THE PRESENT INVENTION

The present invention discloses, in one embodiment, a method for recording and processing vibratory source seismic data, the method including: applying with a vibratory source system a groundforce signal into earth at a selected location, the groundforce signal having a temporal duration and including a reference signal and non-linear noise; recording the groundforce signal with recording apparatus; generating a filter for converting the groundforce signal to a desired short-duration wavelet which, in one aspect, has a temporal duration less than the temporal duration of the groundforce signal; recording at least one reflection signal from a location within the earth of said groundforce signal; and applying the filter to the at least one reflection signal to refine seismic data represented by the at least one reflection signal, thereby producing refined seismic data about the location within the earth. By using the actual groundforce signal rather than some other related signal, e.g. an accelerometer signal, the components of the vibrator's output signal (fundamental signal, non-linear noise—harmonics and subharmonics) are constructively compressed into the desired wavelet, and the harmonic correlation noise is eliminated. Greater stability is achieved in the short-duration wavelet representing each reflection in the recorded data because shotpoint-to-shotpoint variations in topsoil non-linearity are removed from the data as are the noise effects related to non-linearities resulting from the operation of the electrohydraulic vibrator system. The desired wavelet may be (but is not limited to) a Klauder wavelet or a minimum phase wavelet.

In another embodiment of the invention, a plurality of vibratory sources, equal in number to the number of seismic surveys being conducted, transmit signals into the earth. After the first transmission is completed, additional transmissions are performed in which the nominal phase of the signals transmitted by the various vibratory sources is selectively shifted. The number of phase relationships is equal to the number of vibratory sources. The groundforce signal of each of the vibratory sources is recorded and a filter determined by a method described below. The phase at which the seismic signals are transmitted from each vibratory source is selected to enable the signal from each of the vibratory sources to be recovered by data processing. The detected signal resulting from each simultaneous transmission is filtered separately with the derived filter for each vibratory source during the transmission. By stacking the filtered signals corresponding to a particular filter, an output signal is obtained that corresponds to the vibrator associated with the particular filter. This is repeated for the remaining vibrators. This stacking produces records in which the seismic signals emanating from each vibratory source are separated from the signals emanating from the other vibratory sources. In one embodiment of the invention, the minimum number of sweeps is equal to the number of vibrators. In another embodiment of the invention, the number of sweeps is determined based upon the number of vibratory sources and the order of harmonics that is desired to be canceled.

In yet another embodiment of the invention, a single vibratory source is operated on a moving vehicle in a body of water. A measurement of the vibratory source signal is made, either by an accelerometer on the vibratory source or by a hydrophone in the body of water that is moving with the vibratory source. The measured signals are corrected for the Doppler phase shift and the Doppler shift-corrected data are filtered to give a desired wavelet.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED

Figure 1:
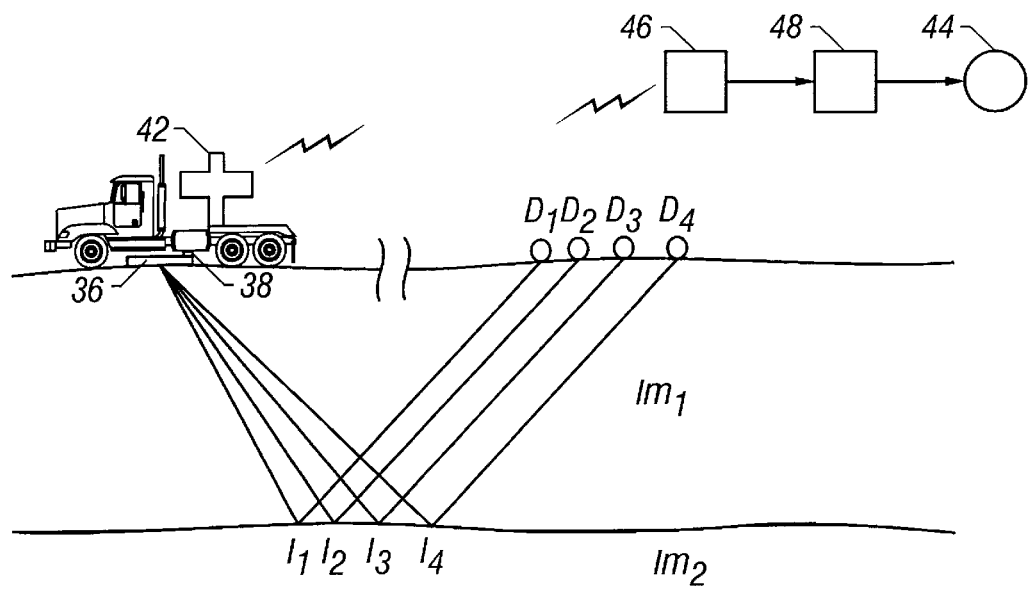
FIG. 1 (PRIOR ART) is a schematic view of typical vibratory seismic data acquisition and processing system.

The system of FIG. 1 has a vibrator 36 with signal measuring apparatus 38 that measure the actual groundforce signal that is generated into the earth, both located on a truck 40.

The signal that is generated into the earth by vibrator 36 is reflected off the interface between subsurface impedances $Im_1$ and $Im_2$ at points $I_1$, $I_2$, $I_3$, and $I_4$. This reflected signal is detected by geophones $D_1$, $D_2$, $D_3$, and $D_4$, respectively. The signals generated by vibrator 36 on truck 40 are transmitted to recorder 46 for transfer to tape 48 or other recording medium for combination with raw seismic data received from geophones $D_1$, $D_2$, $D_3$, and $D_4$. The signals are then transmitted via radio link 42 to a master vibrator memory 44 where they are checked to determine their reliability and are stored for comparison at a later time. The received data signals and the raw seismic data stored on a tape 48 can be transferred to computers at other locations.

Methods of the present invention process this raw data and refine it, eliminating groundforce signal harmonic distortion effects. The measured signals are representative of the actual signals that are generated into the surface of the earth through the vibratory source. These measured signals are minimum phase relatives of the actual signals that are generated into the surface of the earth by this technique.

Figure 2:
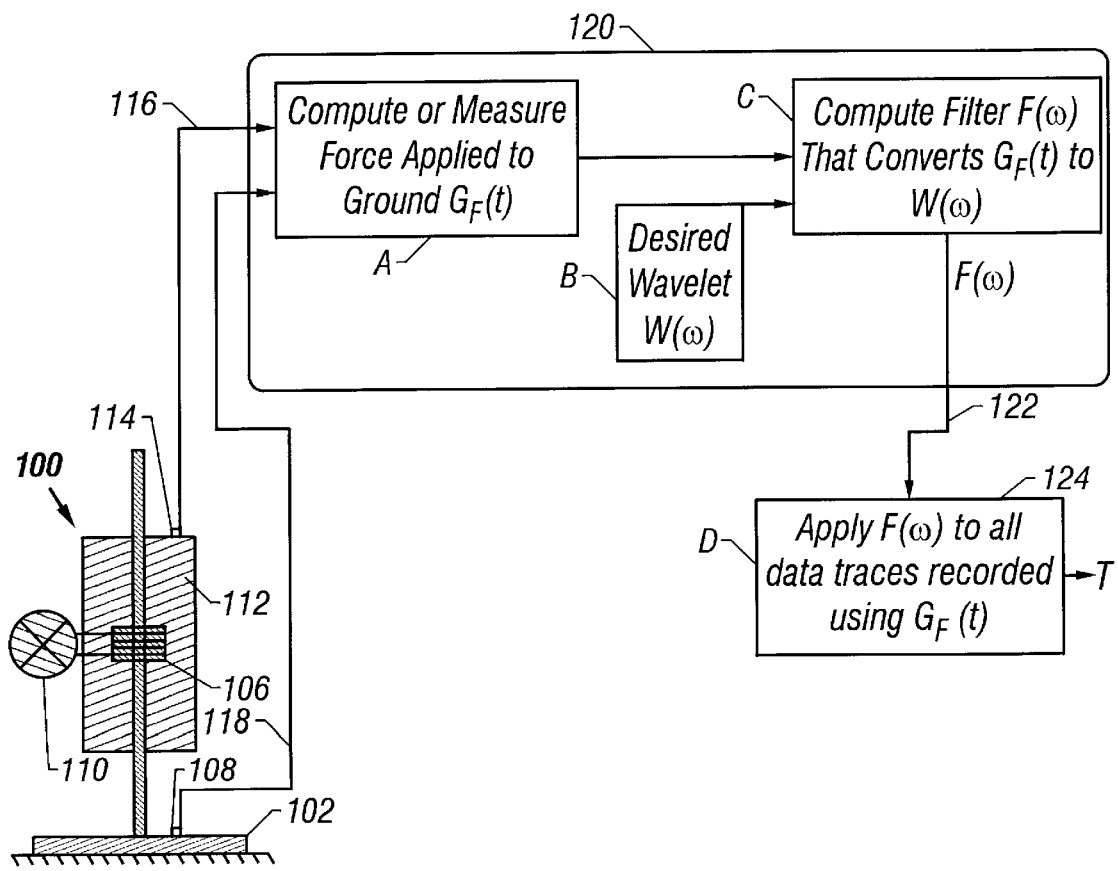
FIG. 2 is a schematic view of a system and method according to the present invention.
Figure 3:
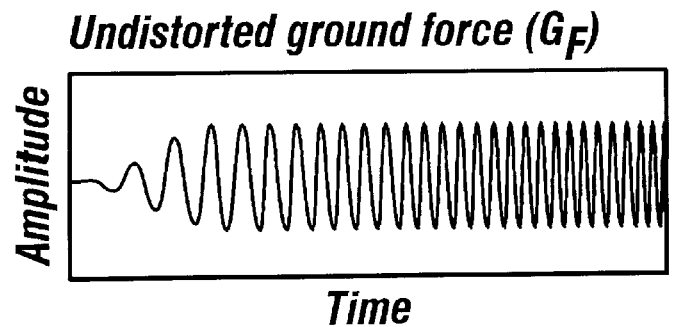
FIG. 3 is a graphical representation of an undistorted groundforce signal (i.e. without non-linear noise in the signal).
Figure 4:
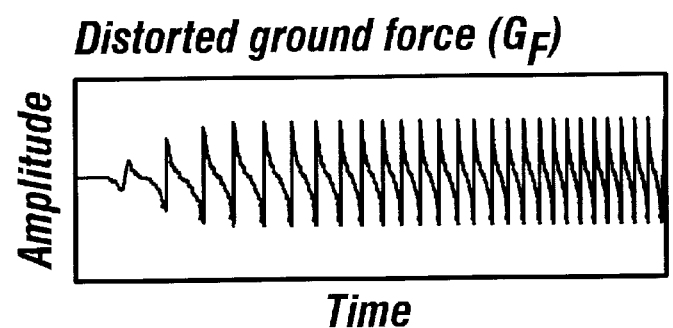
FIG. 4 is a graphical representation of a distorted groundforce signal (i.e. containing non-linear harmonic distortion or noise).
Figure 5:
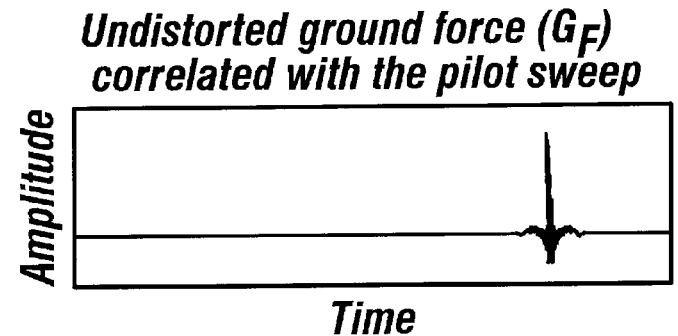
FIG. 5 is a graphical representation of the effect of a prior art correlation method as applied to the undistorted groundforce signal of FIG. 3.
Figure 6:
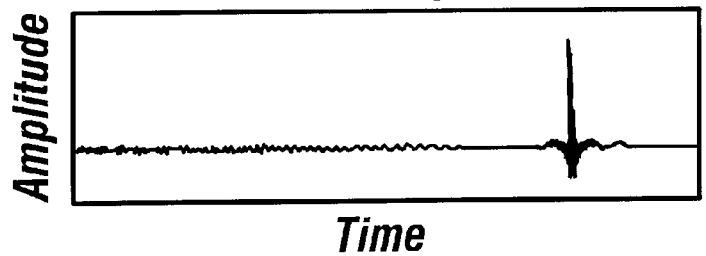
FIG. 6 is a graphical representation of the effect of a prior art correlation method as applied to the distorted groundforce signal of FIG. 3.

FIG. 2 shows a system 100 according to the present invention with a vibratory baseplate 102; a support post 104; a vibrating piston system (electrohydraulic) 106; a control valve 110 for the system 100; a reaction mass 112; a baseplate groundforce signal measuring system 108 connected to the baseplate 102; a reaction mass signal measuring system 114 connected to the reaction mass 112; a communication line 116 connecting the system 114 to a computer 120; a communication line 118 connecting the system 108 to the computer 120; and a communication line 122 connecting the computer 120 to another computer 124.

The system 108 may be any known accelerometer system used to measure, record and transmit an accelerometer signal from a baseplate. The system 114, similarly, may be any known accelerometer system used to measure a reaction mass acceleration. The signal that hits the soil is a combination of the reaction mass signal and the signal from the baseplate.

The computer 120 may be any known computer system suitable for receiving the signal(s) transmitted by the systems 108, 114 and for processing them as indicated schematically in FIG. 2 and as described herein, with appropriate storage, memory, computing and processing components therein. The computer 120 may be located at the site of the system 100 or remote therefrom and may, in one aspect, be on a truck (e.g. a truck 40 as in FIG. 1). Similarly, the computer 124 may be any known computer system suitable for applying the created shaping filter to one or more actual recorded seismic data traces. In one particular aspect, a single computer system is a combination of the computers 120 and 124. The computer 124 maybe located at the site of the system 100 or remote therefrom. Any known data link system or communication system, including but not limited to wire, wireless, and satellite, may be used to link the system 100 and the computers 120, 124.

FIG. 2 shows steps A–C for generating the desired shaping filter $F(\omega)$. In step D, this filter is applied to actual seismic data to produce processed, refined data T from which the effects of non-linear noise of the groundforce signal has been eliminated.

In Step A the computer produces a representation of the groundforce signal (which includes a reference or pilot signal and harmonic distortions due to non-linearitics discussed above) in terms of time, $G_F(t)$. This is either simply a measured signal representation (e.g. directly from a force measuring device) which is processed by the computer 120 to yield $G_F(t)$ or a computed signal computed from outputs from the accelerometers.

In Step B a mathematical representation $W(\omega)$ of a desired wavelet is produced, in one aspect a zero or minimum phase wavelet with a bandwidth equal to or greater than that of the reference (pilot) signal. This is a desired ideal signal representative of the groundforce signal, a wavelet in which the energy of non-linear noise has been used and the effects of the noise then eliminated by converting it to useful seismic energy.

In Step C, using the desired wavelet $W(\omega)$ and the time derivative of the groundforce signal $G_F(t)$, a shaping filter $F(\omega)$ is produced. The shaping filter can be produced by any known method, including but not limited to, dividing the Fourier transform of the desired short-duration wavelet by the Fourier transform of the time derivative of the actual groundforce signal.

In Step D, the shaping filter $F(\omega)$ is applied by known methods (e.g. but not limited to either in the time domain or the frequency domain), to actual seismic data trace In one aspect of the present invention, the shaping filter is expressed and used as $F(\omega)$ (Step C, above), a Fourier transform of the filter. The short-duration wavelet is used as $W(\omega)$ (Step B, above), a Fourier transform of the wavelet and the groundforce is used as $G_F(\omega)$, a Fourier transform of the mathematical representation of the groundforce signal (Step A) above.

For this particular embodiment of the invention, the following notation will be used:

$G_F$ groundforce $G_M$ measured groundforce

D measured seismic data $R_E$ earth reflectivity sequence

W desired wavelet $M_E$ earth filter (e.g. a Q-filter)

In one aspect groundforce is measured in newtons; the seismic data are voltage traces representative of velocity in meters per second, and $F(\omega)$, $M_E$, $W(\omega)$, and $R_E$ are dimensionless numerical mathematical constructs. The groundforce signal $G_F(t)$ is taken as the representation of the radiated groundforce signal. (Alternatively as mentioned above, base plate and reaction mass acceleration could be used instead to produce a computed groundforce signal.) Therefore, in the frequency domain the filter equation is, where $F(\omega)$ is the shaping filter ( a "dot" over the ground force symbol in terms of frequency indicates the time derivative thereof):

$$G_F^\circ(\omega)F(\omega) = W(\omega) \Rightarrow F(\omega) = \frac{W(\omega)}{G_F^\circ(\omega)} \quad (1)$$

Equation (1) accounts for the fact that the groundforce is directly proportional to the displacement, whereas geophones measure velocity, the derivative of displacement. In the frequency domain, the time derivative operator is simply $i\omega$. Equation 1 may then be rewritten as $$F(\omega) = \frac{W(\omega)}{i\omega G_F(\omega)} \quad (2)$$

The factor i in the denominator of equation (2) is a phase shift of $\pi/2$ while the multiplication by $\omega$ boosts the high frequencies. In the real world, the material of the earth does not propagate the high frequencies efficiently, so that a more realistic form for equation (2) is to use $$F(\omega) = \frac{W(\omega)}{f(\omega)G_F(\omega)} \quad (3)$$

where f(ω) is a suitable weighting function. In one embodiment of the invention, the weighting function includes a phase shift of π/2.

The next step is the application of the filter to the raw seismic data D(ω); $D_C(\omega)$ is the refined data in the frequency domain:

$$D_C(\omega) = F(\omega)D(\omega) = \frac{W(\omega)}{f(\omega)G_F(\omega)} D(\omega) \quad (4)$$

where the raw seismic data is defined as:

$$D(\omega) = f(\omega)G_F(\omega)R_E(\omega)M_E(\omega) \quad (5)$$

Therefore the data (T in FIG. 2) after processing are:

$$\frac{W(\omega)}{f(\omega)G_F(\omega)} f(\omega)G_F(\omega)R_E(\omega)M_E(\omega) = R_E(\omega)M_E(\omega)W(\omega) = T \quad (6)$$

Figure 7:
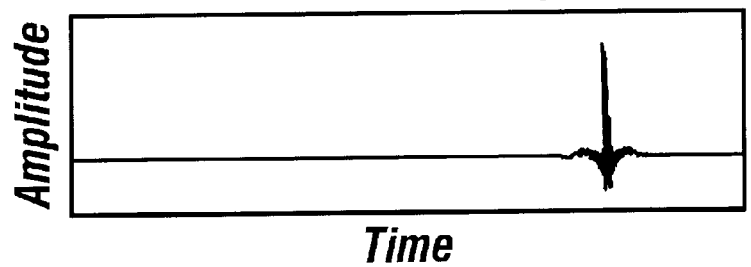
FIG. 7 is a graphical representation of the effect of applying a shaping filter having the same bandwidth as the reference signal.
Figure 8:
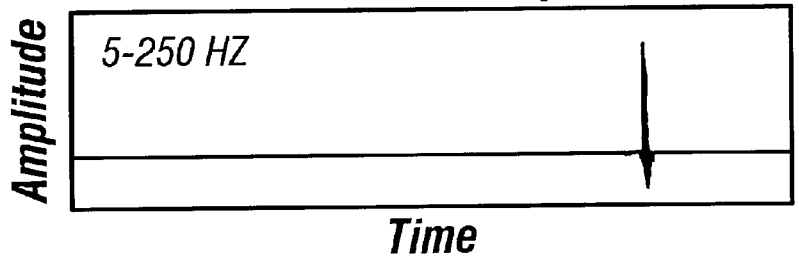
FIG. 8 is a graphical representation of the effect of applying a shaping filter having wider bandwidth than the reference signal.

As illustrated in FIGS. 3–8, use of a known correlation method does not eliminate the effects of non-linear noise from a signal (see FIG. 6) and use of a shaping filter according to the present invention does accomplish this (see FIG. 7). FIG. 7 shows a short duration wavelet according to the present invention that has substantially the same bandwidth as that of the signal of FIG. 3. If the signal of FIG. 4 had a greater bandwidth, then the short duration wavelet could have a bandwidth greater than that of the signal of FIG. 3. It is within the scope of this invention to produce a desired short duration wavelet (as in FIG. 8) with a bandwidth greater than that of a reference signal in a groundforce signal from a vibratory source system. In FIGS. 3–8, the horizontal axis is a time axis with time increasing from left to right and the vertical axis is an amplitude axis (e.g. measured voltages) with amplitude increasing from bottom to top. In the example shown in FIGS. 3–8, the weighting function f(ω) was simply iω. As noted above, other functions could also be used.

Another embodiment of the invention uses the measured ground force signal described above to conduct a plurality n of seismic surveys simultaneously at substantially the same location. This uses the method described in U.S. Pat. No. 4,715,020 issued to Landrum, the contents of which are incorporated here by reference. To conduct n seismic surveys, n vibratory sources are required, and all n vibratory sources transmit n reference signals (or a multiple of n reference signals) into the earth to complete a sequence. In a preferred embodiment, the signals transmitted to the earth may be generally represented by:

$$S(t) = A\sin[\phi(t) + \phi_0] \quad (7)$$

where φ(t) is a function of time and $\phi_0$ represents the initial phase. The initial phase of the signal transmitted by each vibratory source during each transmission of a sequence may be selected according to the following formula $$\phi_0 = \frac{360°(s-1)(v-1)}{n} \quad (8)$$

where $\phi_0$ is the initial phase, s is the sweep number, v is the source number, n is total number of sources. The phase shift is independent of frequency, so the initial phase shift will be present throughout a given sweep, and may properly be referred to as offset phase.

The above formula may be utilized for any number of vibratory sources, even or odd. If an even number of vibratory sources are used other phase angle selections are possible. For an even number of sources, it is only necessary that for any given phase selection, the phase angle 180.degree. out of phase with the given phase angle must also be selected. However, it is preferable to select phase angles having the maximum separation, in order to minimize the possible interference between signals.

For an even number of vibratory sources, the initial phase of the signals transmitted by the vibratory sources during successive transmissions may be selected as follows: After the n phase angles have been selected, these may be designated as phase number 0, phase number 1, phase number 2, . . . phase number (n-1), with the magnitude of the phase angle successively increasing with the phase number. The phase number for each transmission by each vibratory source may then be selected from the formula:

$$\text{Phase number} = (s-1)(v-1) - an \quad (9)$$

where s=sweep number, v=vibrator source number, n=total number of sources and a is a whole number selected so that $$0 \leq [(s-1)(v-1) - an] \leq n \quad (10)$$

Figure 9:
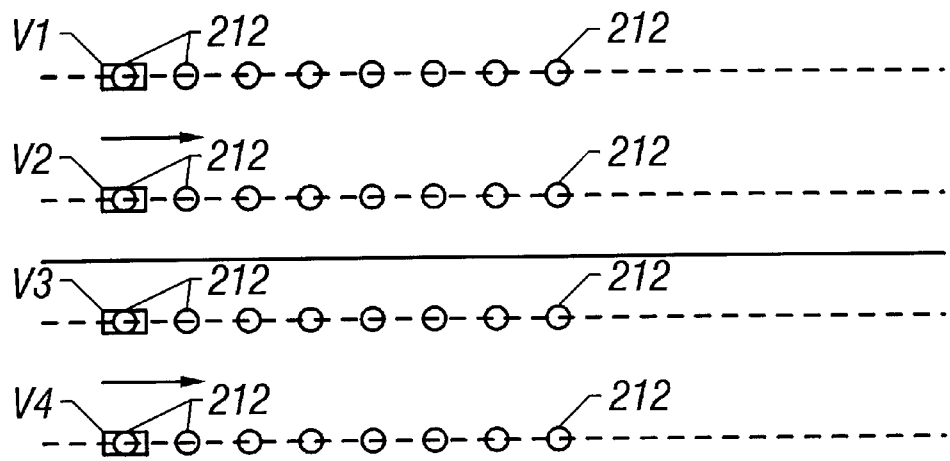
FIGS. 9 and 10 are diagrams illustrating use of the invention to perform a three-dimensional survey.

In performing a seismic survey in accordance with the present method, a selected number of vibratory sources, shown in FIG. 9 as V1, V2, V3 and V4, may be advanced in alignment at laterally spaced apart locations. In this example four vibratory sources are shown. Those versed in the art would recognize that any number of sources as discussed above could be used. Typically, the lateral spacing may be about 50 meters. A first transmission is made at an initial position 212. Successive transmissions are carried out with the signal phases selectively shifted according to criteria herein until a sequence is completed. At the next vibrator position, a repetition of the transmission sequence begins. Possible variations in the method are apparent. For example, a given sweep may be repeated any desired number of times, so long as each sweep within a sequence is repeated the same number of times. It may be desirable to transmit multiple sweeps at each location. The vibrators may advance along either side of a geophone spread G as shown in FIG. 9.

Figure 10:
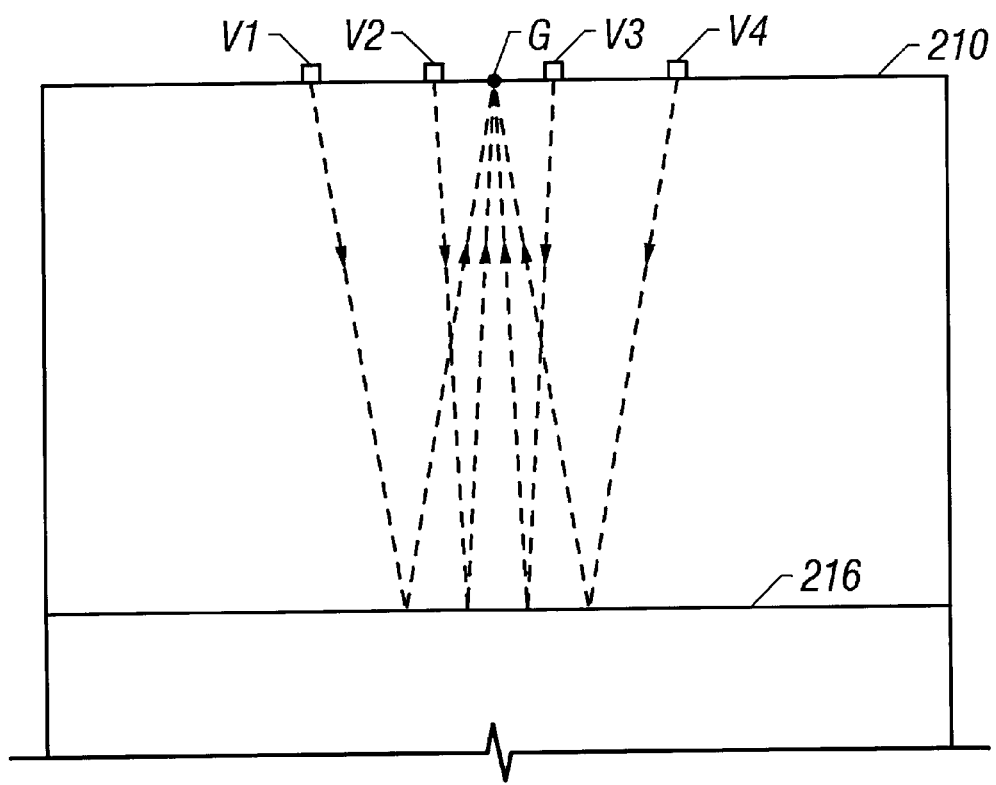

As shown in FIG. 10, the seismic energy travels from the earth's surface 210 downwardly, until it reaches a reflecting interface, such as interface 216. From the interface, a portion of the energy is reflected back to the surface where it is detected. As shown in FIG. 10, energy is reflected back to geophone array G from a different location on reflecting interface 216 for each of the sources. Accordingly, four vibratory sources are able to perform four surveys simultaneously.

The process by which the signal from each of the vibratory sources is separated from the signals emitted by the other vibratory sources is illustrated below. For simplicity, the method is illustrated with only three sources, but the principle applies to other numbers, as well. For three sources, three signals ($S_1$, $S_2$, $S_3$) will be injected having an offset phase calculated as follows from equation (8). It is understood that additions of any multiples of 360° leaves an angle unchanged.

The reflected signal present at a geophone during the first, second and third sweeps will include signals emanating from all three sources as follows:

TABLE 1

Reflected signals for three sweeps

| | |
|---|---|
| Sweep 1: | $S_1 \angle 0° + S_2 \angle 0° + S_3 \angle 0°$ |
| Sweep 2: | $S_1 \angle 0° + S_2 \angle 120° + S_3 \angle 240°$ |
| Sweep 3: | $S_1 \angle 0° + S_2 \angle 240° + S_3 \angle 120°$ |

Each of the vibrators has associated accelerometers for measuring its ground force, as discussed above with respect to FIG. 2. Using the three measured ground force signals (reference signals) from vibrator 1, three filters $g_{11}(t)$, $g_{12}(t)$ and $g_{13}(t)$ are derived. These filters are then applied to the three recorded signals from the three sweeps of Table 1. This gives the three filtered traces as follows:

TABLE 2

Reflected signals filtered with the filter for vibrator 1

Filtered trace 1: $g_{11}(t) \otimes S_1 \angle 0° + g_{11}(t) \otimes S_2 \angle 0° + g_{11}(t) \otimes S_3 \angle 0°$ Filtered trace 2: $g_{12}(t) \otimes S_1 \angle 0° + g_{12}(t) \otimes S_2 \angle 120° + g_{12}(t) \otimes S_3 \angle 240°$ Filtered trace 3: $g_{13}(t) \otimes S_1 \angle 0° + g_{13}(t) \otimes S_2 \angle 240° + g_{13}(t) \otimes S_3 \angle 120°$ where $\otimes$ denotes a convolution. When the three filtered traces are summed, the contributions from vibrator 1 add constructively. As noted above, the filter $g_{11}(t)$ when applied to the first source will produce the desired wavelet W(t) with all harmonics canceled out. Those versed in the art would also recognize that the filter $g_{11}(t)$ applied to the sum $g_{11}(t) \otimes S_2 \angle 0° + g_{12}(t) \otimes S_2 \angle 120° + g_{13}(t) \otimes S_2 \angle 240°$ will produce a signal in which the fundamental and all odd cross-harmonics between the first and the second vibrator will be canceled, leaving only the cross-harmonics between even harmonics of the first vibrator and even harmonics of the second vibrator. Similarly, applying the filter $g_{11}(t)$ to the sum $g_{12}(t) \otimes S_3 \angle 0° + g_{12}(t) \otimes S_3 \angle 240° + g_{13}(t) \otimes S_3 \angle 120°$ will produce a signal in which the fundamental and all odd cross-harmonics between the first and the third vibrator will be canceled, leaving only the cross-harmonics between even harmonics of the first vibrator and even harmonics of the third vibrator.

The same procedure is then repeated using the filters derived from the ground force signals for the second vibrator to give a filtered, substantially harmonic free trace attributable to the second vibrator, and then again using filters derived from the ground force signals for the third vibrator to give a filtered, substantially harmonic free trace attributable to the third vibrator.

Those versed in the art would recognize how the invention discussed above may be applied to any number of vibratory sources to give a set of substantially harmonic free filtered traces corresponding to a plurality of simultaneously acquired seismic surveys.

U.S. Pat. No. 4,982,374 issued to Edington, the contents of which are fully incorporated here by reference, discloses a method of using a plurality of vibrators and determining a number of sweeps and the corresponding phases for each of the plurality of vibrators to eliminate all cross-harmonics, up to and including a specified order, when the recorded signals are cross-correlated with the reference sweep signals. Once the number of sources has been chosen and the desired degree of harmonic cancellation has been determined, an initial choice of a number of sweeps is made. This must be larger than the number of sources, and its size depends on the number of harmonics that are to be cancelled. For example, to cancel the first five harmonics with two sources, at least seven sweeps are required. This is because 2 through 5 times the generator for one source must not be equal to the generator for the other source, which itself cannot be zero.

Taking the number of sweeps chosen to be N, and the number of sources to be S, where S is less than N, a table having N rows and N columns is prepared. Designating the rows as H and the columns as M, each entry in the table is computed according to the following formula;

$$\text{entry} = e_{HM} = (H)(M) \text{ modulo } N$$

Each entry in the first row represents a potential choice of m, and each column represents a possible sequence of m φ for a series of sweeps by a single source. A number of columns equal to the number of sources is selected such that the number in the first row of each selected column does not appear again in any selected column before the row H=F+1, where F is the highest order harmonic determined to cause significant crossfeed; Each selected column is then assigned to a seismic energy source, the initial phase angle for the nth sweep of that seismic energy source being represented by the number in the nth row of that column multiplied by 360°/n.

Another embodiment of the invention may be used in marine seismic acquisition. Marine seismic acquisition differs from land seismic acquisition in that the sources are usually in motion. This gives rise to the well known phenomenon of Doppler shift between the transmitted and received frequency of a vibratory signal when the source and receiver are towed by a moving vessel. Compensating for this Doppler shift is disclosed in U.S. Pat. No. 4,809,235 issued to Dragoset Jr., the contents of which are fully incorporated here by reference.

The invention of Dragoset Jr. is a method of reducing phase distortion in a detected seismic signal resulting from Doppler shifting of the transmitted signal. An operator is convolved with the seismic data to correct the phase distortion. The operator is determined for the particular transmitted signal and boat speed. The operator is normally determined in the frequency-wave number domain. The seismic data may be transformed to the frequency-wave number domain for performing the convolution. The transformed data may then be transformed back to the time-space domain. Alternatively, the determined operator may be transformed to the time-space domain and the convolution performed in that domain.

Figure 11:
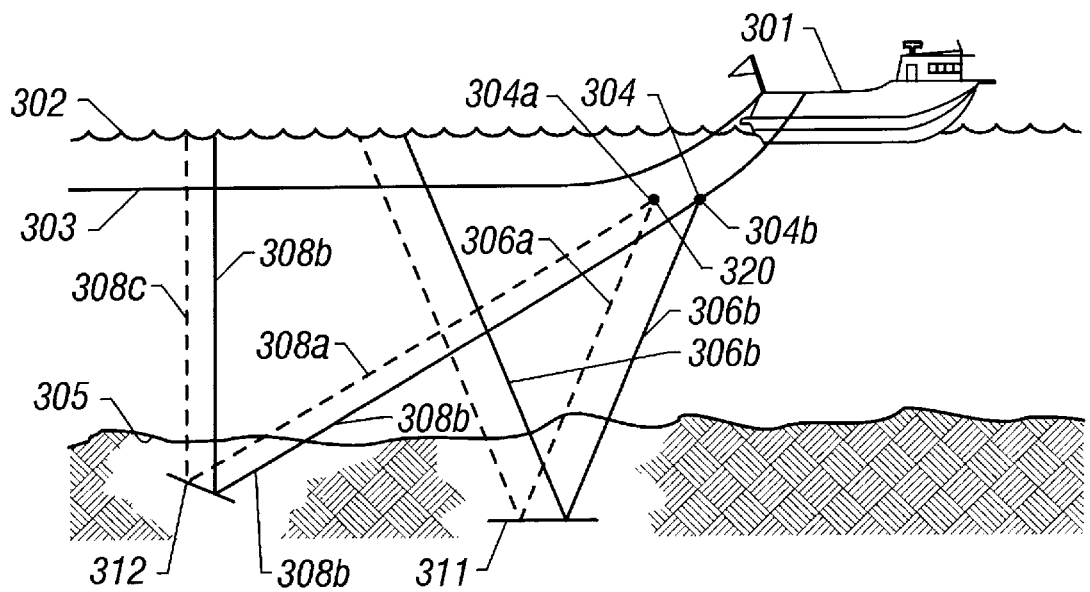
FIG. 11 (PRIOR ART) shows ray paths of seismic signals in the subsurface when the source and receiver are moving in water FIG. 12 (PRIOR ART) shows phase angle dispersion resulting from the motion of the source and receiver in the configuration of FIG. 11.

FIG. 11 represents a marine seismic cable 303 and a marine seismic source 304 being pulled through a body of water 302 by a seismic vessel, showing the source generating a signal as the source is towed from a first position 304a to a second position 304b. From position 304a, the emitted seismic signal is shown travelling along ray paths 306a and 308a to subsurface reflecting interfaces 310 and 312 respectively. From position 304b the signal will travel along ray paths 306b and 308b. It can be seen that, for a reflection from an interface lying parallel to the earth's surface, the length of the path travelled by the seismic signal along paths 306a and 306b will be the same, hence, there will be no Doppler effect. However, because of the dip of the reflecting interface 312, ray path 308b is longer than ray path 308a, with the result that the frequency of the signal detected by the receiver on the cable as the source moves from position 304a to 304b will be lower than the frequency of the signal transmitted by the source. A dip of the reflecting interface in the opposite direction would, of course, result in an increased detected frequency. A device for measuring the outgoing signal from the vibrator is placed at a suitable location 320 that moves with the vibrator. The monitoring device could be a towed hydrophone or an accelerometer mounted in contact with the vibrator.

Figure 12:
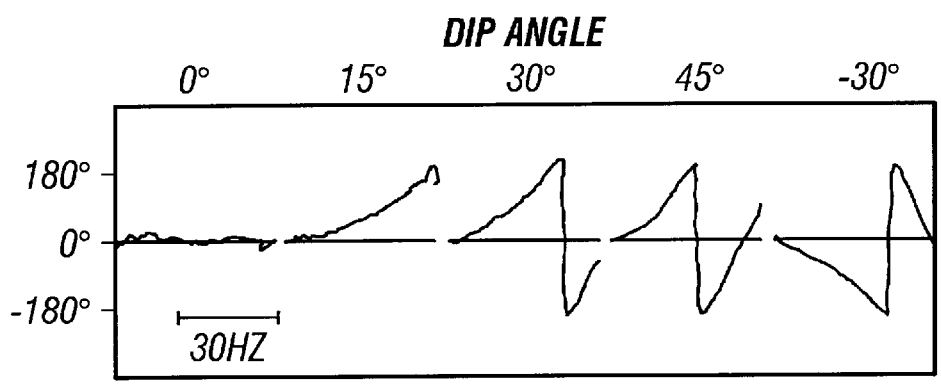

FIG. 12 shows the phase dispersion more quantitatively. Shown are plots of phase as a function of frequency and dip angle of the reflecting interface determined by making the necessary calculations on the phase shift given in Dragoset Jr.

Figure 13A:
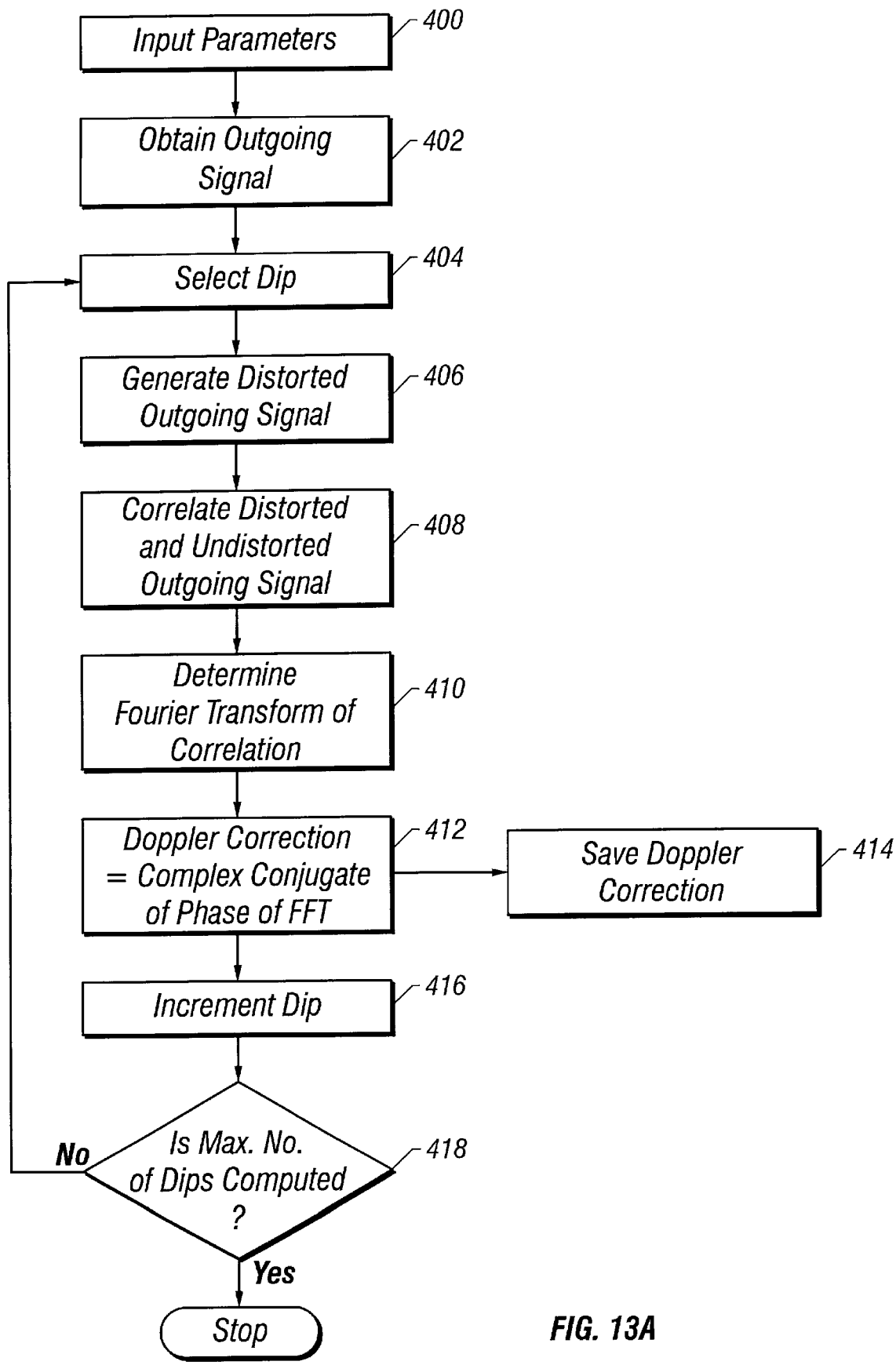
FIGS. 13A, 13B show the implementation of the present invention in a marine data acquisition system.
Figure 13B:
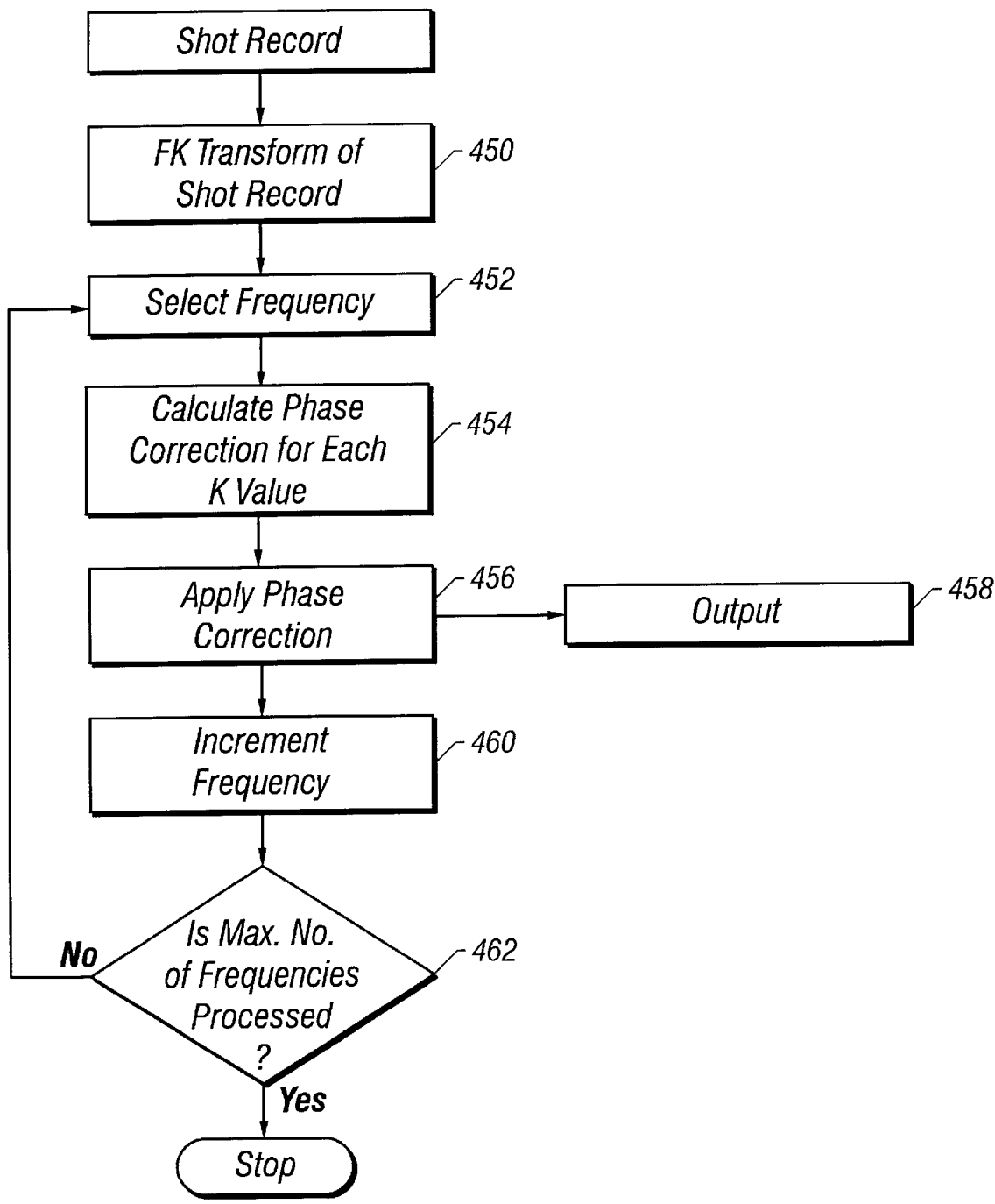

Next, FIGS. 13 and 14 show how the present invention applies the Doppler phase shift to marine vibrator data. The following is a brief discussion of how method of Dragoset is adapted for the present invention.

The input parameters are specified at 400. These include the maximum dip expected for which the signals are to be processed, the dip increment between computations of the phase correction filters, the lowest frequency to process, the highest frequency to process, the ship speed and the maximum correlation lag to be applied in processing.

Next at 402, the outgoing signal is obtained. This could be from a hydrophone towed near the vibrator or it could be from accelerometers on the vibrator. An initial angle for phase shift correction operators is selected 404. The distorted version of the outgoing signal is determined based upon the input parameters and the outgoing signal. This distorted version is correlated with the undistorted outgoing signal at 408 to give a correlated signal. The Fourier transform of the correlated signal is determined 410 by a suitable technique, such as a Fast Fourier Transform (FFT). The Doppler correction is obtained 412 by negating the phase of the correlated signal. This Doppler correction is saved 414. The dip angle for computations is incremented 416 and a check is made to see if the maximum number of dip angles has been processed 418. If not, processing is repeated for the next dip angle at 404 and the steps from 404–418 are repeated until all the dip angles have been processed, at which point, this phase of the processing stops.

Turning now to FIG. 15, the data are retrieved in shot sequential format and a Fourier transform of the shot record is obtained 450 by a suitable method such as a FFT, to give data in the f–k domain. An initial frequency for processing is selected and for each value of k at that frequency, a phase correction is calculated. This is obtained from looking up the tables at 414 in FIG. 13, using an interpolation where necessary. Those versed in the art would recognize that each k in the f–k domain has a corresponding dip associated with it. The Doppler phase shift is applied 456 and the partial output is stored 458. The frequency is incremented 460 and a check is made to see if all the desired frequencies have been processed 462. If not, processing is repeated for all the desiree frequencies by repeating steps 452–462.

Once all the shot records have been processed, the Doppler phase shift corrected data may be used for subsequent steps in the processing. Those versed in the art would know that a near field towed hydrophone, an accelerometer on the body of the marine vibrator, and a hydrophone, on the seismic streamer 303 of FIG. 11 all make pressure or force measurements and there is no relative phase shift between them. This is in contrast to the land embodiment of the invention where the force measurements on the base plate is related to a time derivative of recorded geophone signals. Accordingly, no phase shift is necessary in the filtering operation. The invention as described above would give an impulse response of the earth.

What is claimed is:

1. A method of conducting n seismic surveys simultaneously at substantially the same location where n is a whole number greater than one comprising:
    (a) simultaneously transmitting with n vibratory sources, associated groundforce signals into the earth, each said groundforce signal including a reference signal and non-linear noise, each said reference signal having a temporal duration;
    (b) recording with a first recording apparatuses n groundforce signals;
    (c) generating n filters for converting each said groundforce signal to a short-duration wavelet;
    (d) recording with a second recording apparatus at least one reflection signal from a location within the earth of said plurality of groundforce signals;
    (e) repeating steps (a)–(d) n times, varying an initial phase of each said groundforce signal among n initial phases to give n variations of the at least one reflected signal;
    (f) applying the filters associated with a selected vibratory source to the n variations of the at least one reflected signals to give n filtered signals corresponding to the selected vibratory source; and
    (f) stacking the n filtered signals to give a recovered reflection signal associated with the selected vibratory source.

2. The method of claim 1 wherein each said reference signal has a bandwidth that is less than at least one of (i) a bandwidth of each of the n filters, and (ii) a bandwidth of the short duration wavelet.

3. The method of claim 1 wherein the at least one reflection signal includes a plurality of reflection signals, each reflecting from a different location within the earth back to the recording apparatus; the method further comprising:
    (i) recording with the recording apparatus the plurality of reflection signals; and
    (ii) applying said filters to each of the plurality of reflection signals.

4. The method of claim 1 wherein the short-duration wavelet is selected from the group consisting of (i) an autocorrelation of the reference signal, (ii) a zero phase wavelet with a prescribed amplitude spectrum, (iii) a minimum phase wavelet with a prescribed amplitude spectrum, and (iv) a Klauder wavelet.

5. The method of claim 1 wherein generating the filter further comprises dividing a Fourier transform of the short-duration wavelet by a Fourier transform of a time derivative of the groundforce signal.

6. The method of claim 1 wherein each said groundforce signal is measured directly with a force measuring device at the vibratory source system.

7. The method of claim 1 wherein each said vibratory source includes a reaction mass with a first accelerometer and a baseplate with a second accelerometer and the associated groundforce signal is determined from outputs of the first and second accelerometers.

8. The method of claim 1 wherein the non-linear noise includes harmonic distortion due to non-linearity in each said vibratory source and in contact of each said vibratory source system to the earth.

9. The method of claim 1 further comprising a processor interconnected with the n vibratory sources and with the first and second recording apparatus, said processor determining the short-duration wavelet and generating said filters.

10. The method of claim 1 wherein all n reference signals are identical except for variations in phase.

11. The method of claim 1 wherein at least one of said n reference signals differs from at least one of the other n reference signals other than in phase.

12. The method of claim 1 further comprising selecting an initial phase angle of each said reference signal in a manner that makes a vector summation of n unit vectors having the n phase angles is substantially zero.

13. The method of claim 1 wherein an initial phase of the reference signals transmitted by each vibratory source for each transmission is determined from the formula $$\phi_0 = \frac{360°(s-1)(v-1)}{n}$$

where $\phi_0$ is the reference signal initial phase angle, s is a sequence number corresponding to the repetitions of step (e), and v is a source number of each vibratory source.

14. The method of claim 1 wherein an n is an even number and the initial phases of the transmitted signals are selected from a group of phases in which, for any given selected phase angle, the phase angle 180 degrees out of phase with said given selected phase angle is also selected.

15. The method of claim 14 wherein n=4.

16. A method of conducting n seismic surveys simultaneously at substantially the same location where n is a whole number greater than one comprising:
  (a) simultaneously transmitting with n vibratory sources, associated groundforce signals into the earth, each said groundforce signal including a reference signal and non-linear noise, each said reference signal having a temporal duration;
  (b) recording with a first recording apparatus said n groundforce signals;
  (c) generating n filters for converting each of said n groundforce signal to a short-duration wavelet;
  (d) recording with a second recording apparatus at least one reflection signal from a location within the earth of said plurality of groundforce signals;
  (e) selecting the highest order F harmonic which has sufficient signal strength to cause significant harmonic distortion of the reference signals;
  (f) selecting a number N of sweeps for each vibratory source, N being greater than n;
  (g) selecting initial phase angles for each reference sweep of each seismic energy source so that substantially all harmonics up to and including said highest order harmonic are suppressed, wherein the step of selecting initial phase angles comprises:
    (i) constructing a table with N rows and N columns, each entry $e_{hm}$ being calculated from the formula $e_{hm}$=h m modulo (N) where h is the row number and m is the column number;
    (ii) selecting a number of columns equal to the number of sources such that the number in the first row of each selected column does not appear again in any selected column before the row H=F+1, where F is the highest order harmonic determined to cause significant crossfeed;
    (iii) assigning a selected column to each seismic energy source, the initial phase angle for the k-th sweep of that seismic energy source being represented by the number in the k-th row of that column multiplied by $2\pi/N$
  (h) repeating steps (a)–(d) N times, varying an initial phase of each said groundforce signal among N initial phases to give N variations of the at least one reflected signal;
  (i) applying the filter associated with a selected vibratory source to the N variations of the at least one reflected signals to give a N filtered signals corresponding to the selected vibratory source; and
  (j) stacking the N filtered signals to give a recovered reflection signal associated with the selected vibratory source.

17. The method of claim 16 wherein each said reference signal has a bandwidth that is less than at least one of (A) a bandwidth of each of the n filters, and (B) a bandwidth of the short duration wavelet.

18. The method of claim 16 wherein the at least one reflection signal includes a plurality of reflection signals, each reflecting from a different location within the earth back to the recording apparatus; the method further comprising:
  (A) recording with the recording apparatus the plurality of reflection signals; and
  (B) applying said filter to each of the plurality of reflection signals.

19. The method of claim 16 wherein the short-duration wavelet is selected from the group consisting of (A) an autocorrelation of the reference signal, (B) a zero phase wavelet with a prescribed amplitude spectrum, (C) a minimum phase wavelet with a prescribed amplitude spectrum, and (D) a Klauder wavelet.

20. The method of claim 16 wherein generating the filter further comprises dividing a Fourier transform of the short-duration wavelet by a Fourier transform of a time derivative of the groundforce signal.

21. The method of claim 1 wherein each said groundforce signal is measured directly with a force measuring device at the vibratory source system.

22. The method of claim 1 wherein each said vibratory source includes a reaction mass with a first accelerometer and a baseplate with a second accelerometer and the associated groundforce signal is determined from outputs of the first and second accelerometers.

23. The method of claim 1 wherein the non-linear noise includes harmonic distortion due to non-linearity in each said vibratory source and in contact of each said vibratory source system to the earth.

24. The method of claim 16 further comprising a processor interconnected with the n vibratory sources and with the first and second recording apparatus, said processor determining the short-duration wavelet and generating said filters.

25. The method of claim 18 wherein selecting the highest order harmonic includes operating the seismic energy source over a frequency band within the seismic frequency range and looking for frequencies above that band in the seismic signals.

26. The method of claim 19, wherein the width of the frequency band is about one octave.

27. A method for recording and processing vibratory source seismic data, the method comprising
  (a) applying with a vibratory source system a groundforce signal into the earth at a selected location, said groundforce signal including a reference signal and non-linear noise, said reference signal having a temporal duration,
  (b) recording with first recording apparatus said groundforce signal,
  (c) generating a filter for converting said groundforce signal to a short-duration wavelet,
  (d) recording with second recording apparatus at least one reflection signal from a location within the earth of said groundforce signal, and (e) applying said filter to said at least one reflection signal to refine seismic data represented by said at least one reflection signal producing refined seismic data about the location within the earth.

28. The method of claim 27 wherein each said reference signal has a bandwidth that is less than at least one of (i) a bandwidth of the filter, and (ii) a bandwidth of the short duration wavelet.

29. The method of claim 27 wherein the at least one reflection signal includes a plurality of reflection signals, each reflecting from a different location within the earth back to the recording apparatus; the method further comprising:

(i) recording with the recording apparatus the plurality of reflection signals; and (ii) applying said filter to each of the plurality of reflection signals.

30. The method of claim 27 wherein the short-duration wavelet is selected from the group consisting of (i) autocorrelation of the reference signal, (ii) a zero phase wavelet with a prescribed amplitude spectrum, (iii) a minimum phase wavelet with a prescribed amplitude spectrum, and (iv) a Klauder wavelet.

31. The method of claim 27 wherein generating the filter further comprises dividing a Fourier transform of the short-duration wavelet by a Fourier transform of a time derivative of the groundforce signal.

32. The method of claim 27 wherein each said groundforce signal is measured directly with a force measuring device at the vibratory source system.

33. The method of claim 1 wherein each said vibratory source includes a reaction mass with a first accelerometer and a baseplate with a second accelerometer and the associated groundforce signal is determined from outputs of the first and second accelerometers.

34. The method of claim 1 wherein the non-linear noise includes harmonic distortion due to non-linearity in each said vibratory source and in contact of each said vibratory source system to the earth.

35. A method for recording and processing vibratory source marine seismic data, the method comprising (a) applying with a vibratory source towed by a moving vessel, an outgoing signal into a body of water, said outgoing signal including a reference signal and non-linear noise, said reference signal having a temporal duration;

(b) recording with a first recording apparatus said outgoing signal, (c) generating a filter for converting said outgoing signal to a short-duration wavelet, (d) recording with a second recording apparatus at least one reflection signal from a location within the earth below the body of water of said outgoing signal, (e) applying said phase correcting operator to said at least one reflection signal to obtain a phase corrected reflection signal;

(f) applying said filter to said phase corrected reflection signal to refine seismic data represented by said at least one reflection signal producing refined seismic data about the location within the earth.

36. The method of claim 35 further comprising determining a phase correcting operator to correct said outgoing signal for said speed of motion.

37. The method of claim 35 wherein said reference signal has a bandwidth that is less than at least one of (i) a bandwidth of said filter, and (ii) a bandwidth of the short duration wavelet.

38. The method of claim 35 wherein the at least one reflection signal includes a plurality of reflection signals, each reflecting from a different location within the earth back to the recording apparatus; the method further comprising:

(i) recording with the recording apparatus the plurality of reflection signals; and (ii) applying said filter to each of the plurality of reflection signals.

39. The method of claim 35 wherein the short-duration wavelet is selected from the group consisting of (i) an autocorrelation of the reference signal, (ii) a zero phase wavelet with a prescribed amplitude spectrum, (iii) a minimum phase wavelet with a prescribed amplitude spectrum, and (iv) a Klauder wavelet.

40. The method of claim 35 wherein generating the filter further comprises dividing a Fourier transform of the short-duration wavelet by a Fourier transform of the outgoing signal.

41. The method of claim 35 wherein each said outgoing signal is measured directly with device selected from (i) a hydrophone near the vibratory source, and (ii) an accelerometer coupled to the vibratory source.

42. The method of claim 35 wherein the non-linear noise includes harmonic distortion due to non-linearity in said vibratory source.

43. The method of claim 36 wherein the phase correcting operator is determined in the frequency-wave number domain.

44. The method of claim 36 further comprising computing for a plurality of selected time dips the distorted forms of the outgoing signal resulting from the selected time dips.

* * * * *